United States Patent [19]

Amari et al.

[11] Patent Number: 4,974,195

[45] Date of Patent: Nov. 27, 1990

[54] DOCUMENT PROCESSING APPARATUS

[75] Inventors: Takashi Amari, Tokyo; Hideo Shibaoka, Yokohama, both of Japan

[73] Assignee: Canon Kabushiki Kaisha, Tokyo, Japan

[21] Appl. No.: 484,488

[22] Filed: Feb. 26, 1990

Related U.S. Application Data

[63] Continuation of Ser. No. 63,404, Jun. 18, 1987.

[30] Foreign Application Priority Data

Jun. 20, 1986 [JP] Japan ................. 61-145623
Jun. 20, 1986 [JP] Japan ................. 61-145624

[51] Int. Cl.$^5$ .................... G06F 9/20; G06F 5/00
[52] U.S. Cl. ..................... 364/900; 364/943; 364/943.2; 364/943.41; 364/943.43; 434/156
[58] Field of Search ... 364/200 MS File, 900 MS File, 364/419; 434/156, 157; 400/7

[56] References Cited

U.S. PATENT DOCUMENTS

| | | | |
|---|---|---|---|
| 4,092,729 | 5/1978 | Rosenbaum et al. | 364/900 |
| 4,181,972 | 1/1980 | Casey | 364/900 |
| 4,354,765 | 10/1982 | Buchanan et al. | 400/7 |
| 4,383,307 | 5/1983 | Gibson, III | 364/900 |
| 4,417,322 | 11/1983 | Berry et al. | 364/900 |
| 4,456,969 | 6/1984 | Herzik et al. | 364/419 X |
| 4,574,363 | 3/1986 | Carlgren et al. | 364/900 |
| 4,590,560 | 5/1986 | Sado | 434/156 |
| 4,672,571 | 6/1987 | Bass et al. | 364/900 |
| 4,771,401 | 9/1988 | Kaufman et al. | 364/419 X |
| 4,775,251 | 10/1988 | Suzuki et al. | 364/419 X |
| 4,777,617 | 10/1988 | Frisch et al. | 364/419 |

FOREIGN PATENT DOCUMENTS 0026286 4/1981 European Pat. Off. ........... 400/7

OTHER PUBLICATIONS

Carlgren, R. G., "Suffix-Dependent Hyphenation Data Storage Technique", *IBM Tech. Discl. Bull.*, vol. 26, No. 11, Apr. 1984, pp. 6095-6096.

*Primary Examiner*—Joseph L. Dixon
*Attorney, Agent, or Firm*—Fitzpatrick, Cella, Harper & Scinto

[57] ABSTRACT

A document processing apparatus includes: a memory to verify both of the spelling of a word including a syllable hyphen and the spelling of a word including no syllable hyphen; a reading device to read out a word across two lines in a document processing format; a spelling verifier to access the memory and to check the spelling of the word; and a control unit for allowing the spelling verifier to perform the verifying operation at least two or more times on the basis of the result read out from the reading device, for discriminating whether the hyphen in the word across two lines is the permanent hyphen to form a synthesized word or a syllable hyphen, and for controlling the spelling verifier to perform the spelling verification. The memory is a basic dictionary memory in which the correct spelling and correct syllable hyphen position of each word are stored. With this apparatus, the spelling verification can be performed on the basis of the hyphen inserting position in a sentence and of the kind of hyphen used. When a document is printed, the word wrap process and the hyphenation process can be automatically efficiently performed.

16 Claims, 7 Drawing Sheets

(a) . . mother-in-law . . .
(b) . . mother-in-law . . .
(c) . . mother- . . .
    -in-law . . .
(d) . . mother- . . .
    in-law . . .
(e) . . mother- . . .
    in-law . . .
(f) . . mother-in- . . .
    law . . .
(g) . . mother-in- . . .
    law . . .
(h) . . mother-in- . . .
    law . . .
(i) . . . . mother-in-law

FIG. 12

(a) . typewriting . . type . .
(b) . typewriting . . type . .
(c) . . writing . . type- . .
(d) . . writing . . type- . .
(e) . . writing . . type- . .
(f) . . ing . . typewrit- . .
(g) . . ing . . typewrit- . .
(h) . . . . typewriting . .

DOCUMENT PROCESSING APPARATUS

This application is a continuation-in-part of application Ser. No. 063,404 filed June 18, 1987, now abandoned.

BACKGROUND OF THE INVENTION

1. Field of the Invention

The present invention relates to a document processing apparatus having a spelling verifier to verify the spelling of a word and a data base in which information regarding the suitable hyphenation position in each word at which a hyphen can be inserted is stored, wherein the word including the hyphen can be distinguished and verified by the position of the hyphen in a sentence and the kind of hyphen.

The invention also relates to an European language document processing apparatus and, more particularly, to a document processing apparatus which can automatically perform the hyphenation upon printing on the basis of the hyphenation information stored in a storing device attached thereto.

2. Related Background Art

When an European language sentence is formed, if a word is not typed within a margin and exceeds the limit on the right side of the print width (hereinafter, referred to as a right margin), a hyphen is inserted into a proper position in the word which does not reach the right margin, the word is printed until this hyphen, and the remaining characters of the word are printed in the next line. (Hereinafter, this operation is called a hyphenation.)

Figures 9, 10:
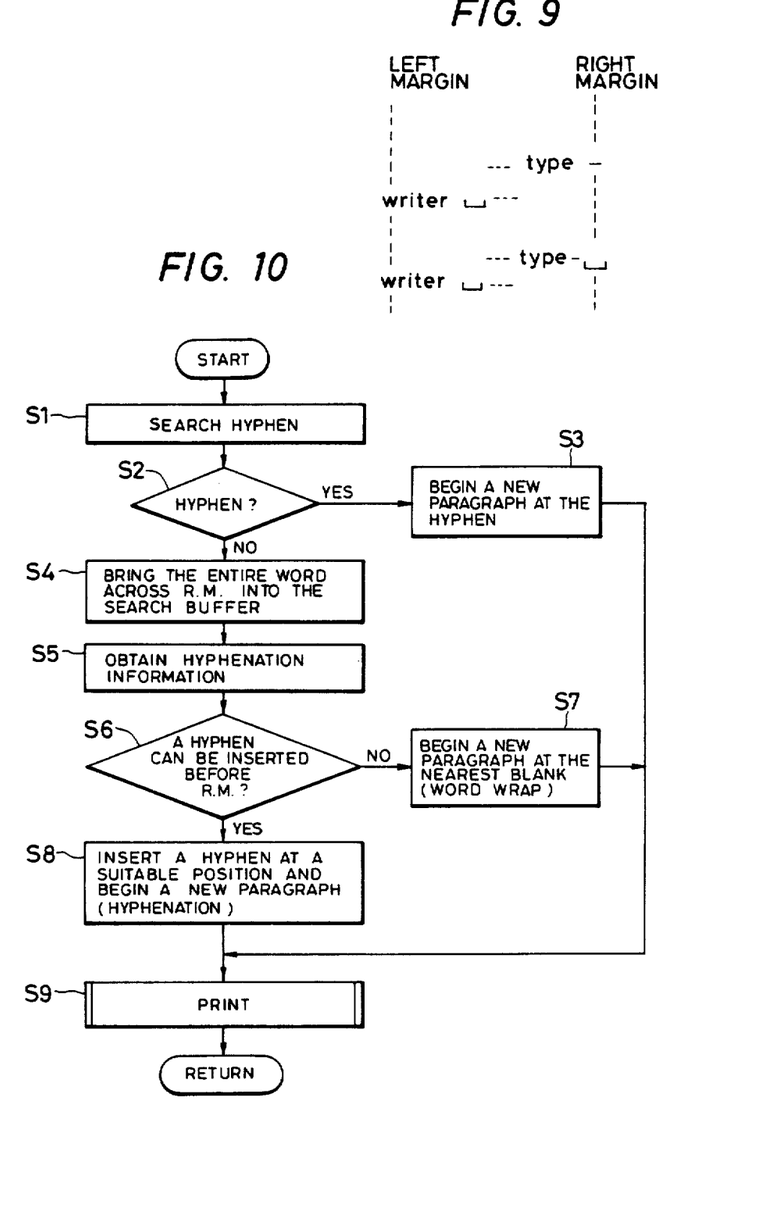
FIG. 9 is a diagram showing an example in which a word "typewriter" was hyphened.
FIG. 10 is a flowchart for the automatic hyphenation process.

FIG. 9 shows a state in which a word "typewriter" was hyphened.

Hitherto, the spelling of such a hyphened word cannot be verified. However, since the suitable hyphen inserting position of a word has already been grammatically determined, there is a problem such that even if the hyphenation was performed by inserting a hyphen into the wrong position, the correct spelling of the word cannot be verified.

Namely, two kinds of hyphens are used when an European language sentence is formed: one is a hyphen which is used to perform the hyphenation when a word exceeds the right margin; and the other is a hyphen which is used to form one word by synthesizing a plurality of words, such as "high-speed".

When considering those two kinds of hyphens from the viewpoint of the verification of the spelling, the former kind of hyphen is used to combine a character string across a plurality of lines into one word and is unnecessary to verify the spelling. On the other hand, the latter kind of hyphen is used as a delimiter to divide one word synthesized by a plurality of words into a plurality of component words.

In the case of former hyphen, the accurate spelling verification can be performed only when not only the spelling is verified but also when it is checked as to whether or not the hyphen has been inserted into the correct hyphenation position.

In the case of printing a document written in English or the like stored in a storage device, if the length of a word exceeds the margin of the line, it is necessary to perform a word wrap process to print the word from the next line or a hyphenation process to divide the word into two words by a hyphen. Hitherto, in such a case, the operator designates the position of the character to be printed from a new line each time, thereby executing the hyphenation process or the word wrap process.

However, according to the foregoing method, when a document is printed, the operator must stand by for the output apparatus to request the line feed position, so that this method is very inconvenient. On the other hand, when the line feed position is designated, there is a problem such that if operator does not have the knowledge regarding the correct hyphenation position, the hyphenation is performed at a position which is grammatically incorrect.

SUMMARY OF THE INVENTION

It is an object of the present invention to eliminate the foregoing drawbacks.

Another object of the invention is to provide a document processing apparatus comprising basic dictionary means in which correct hyphen inserting positions are stored and means for comparing the input character data with the data stored in the basic dictionary means and when a hyphen is not inserted into the correct hyphen inserting position, and for informing the operator of this fact.

Still another object of the invention is to provide a document processing apparatus in which when the position of the hyphen inserted by the hyphenation is wrong, the operator can be informed of this erroneous insertion.

Still another object of the invention is to provide a document processing apparatus in which in order to solve the foregoing drawbacks of the conventional technique, a data base having information regarding the correct hyphenation positions is provided, the hyphenation is automatically performed when the stored document is printed, thereby reducing the load on the user.

Still another object of the invention is to provide a document processing apparatus having control means for inserting and printing a hyphen and then changing the line when a word exceeds the print width, thereby enabling the hyphenation process at the end of the line to be easily performed without requiring the executing of the operation by the operator.

Still another object of the invention is to provide a document processing apparatus for discriminating whether the hyphen is a hyphen for synthesized characters or a syllable hyphen, thereby performing the verification control.

Still another object of the invention is to provide a document processing method comprising the steps of: verifying each word which is divided by a hyphen with respect to words including hyphens; deleting the hyphen from the word and verifying the word; and checking a hyphen inserting position.

Still another object of the invention is that when a word exceeds the print width, the portion at the front stage of this word is discriminated whether or not a permanent hyphen exists or whether or not a syllable hyphen position exists, and the line feed printing operation is controlled on the basis of the result of the discrimination.

BRIEF DESCRIPTION OF THE DRAWINGS

FIGS. 11(a)–(i) and 12(a)–(h) are diagrams showing examples of the print states in accordance with the present invention.

DETAILED DESCRIPTION OF THE PREFERRED EMBODIMENTS

An embodiment of the present invention will be described hereinbelow with reference to the drawings.

Figure 1:
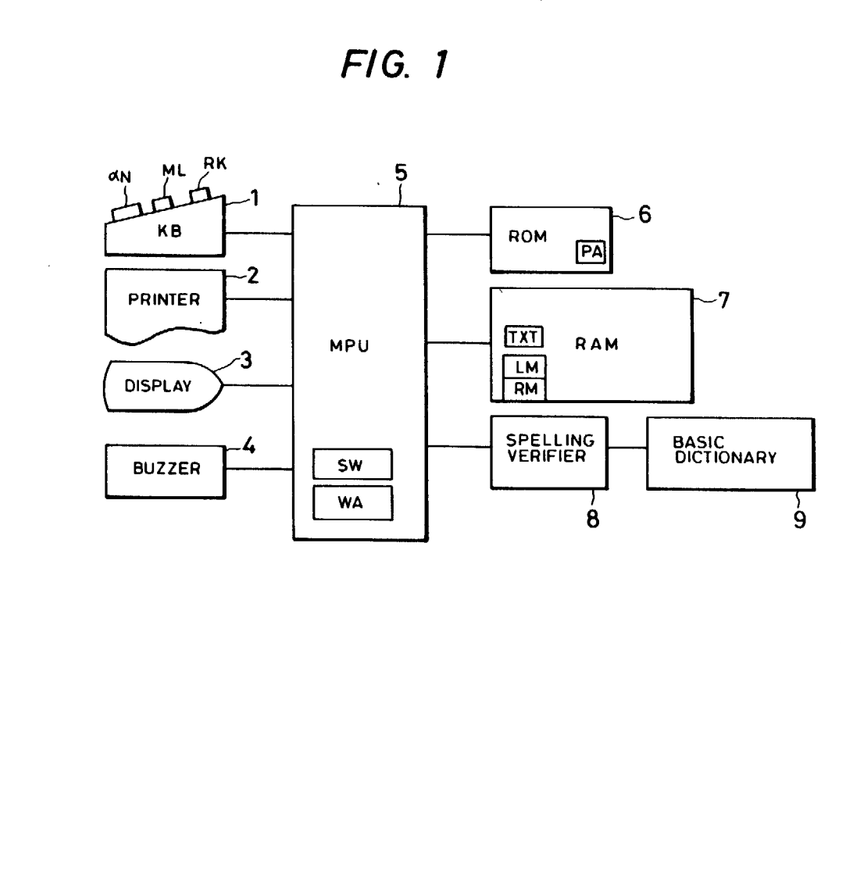
FIG. 1 is a schematic diagram showing a constitution of an electronic typewriter according to the present invention.

FIG. 1 is a block diagram showing the constitution of an electronic typewriter as an embodiment of the invention.

Reference numeral 1 denotes a keyboard having a key αN to input character data and keys to instruct the printing operation and to instruct the editing operation such as changes of the right and left margins and the like; 2 indicates a printer to print and output the edited document data; 3 denotes a display to display the input character data and the edited document data; 4 denotes a buzzer to generate a warning when an error is detected in the spelling; and 5 denotes an MPU for controlling peripheral apparatuses such as the keyboard 1, printer 2, and the like in accordance with control programs, which will be explained hereinlater, stored in a ROM 6. Numeral 8 denotes a spelling verifier for taking out hyphenation information from an attached dictionary, thereby verifying the spelling. Numeral 9 represents a basic dictionary in which the words of the correct spellings and the correct hyphen inserting positions are stored. For example, data such as "typewriting: type. writ.ing" is stored in this dictionary.

The character data input from the keyboard 1 is sequentially stored in a document storage area TXT in a RAM 7. When the character data is sequentially input to the document storage area TXT and an amount of input data has reached the margin width specified by a left margin storage area LM in which the number of digits indicative of the left margin stored in the RAM 7 is stored and by a right margin storage area RM in which the number of digits indicative of the right margin stored in the RAM 7 is stored, the MPU 5 does not accept the input of the character key αN provided on the keyboard 1. In this case, the character data from the character key αN can be input by inputting a return code due to the operation of a return key RK provided on the keyboard 1 or by operating a margin release key ML. The return code input by the operation of the return key RK is stored as a line feed code in the document storage area TXT.

The spelling of a word is verified every delimiter of the word of a group of character codes which were input by operating the character key αN on the keyboard 1, namely, each time a code such as space, period, or comma is input.

Figure 2:
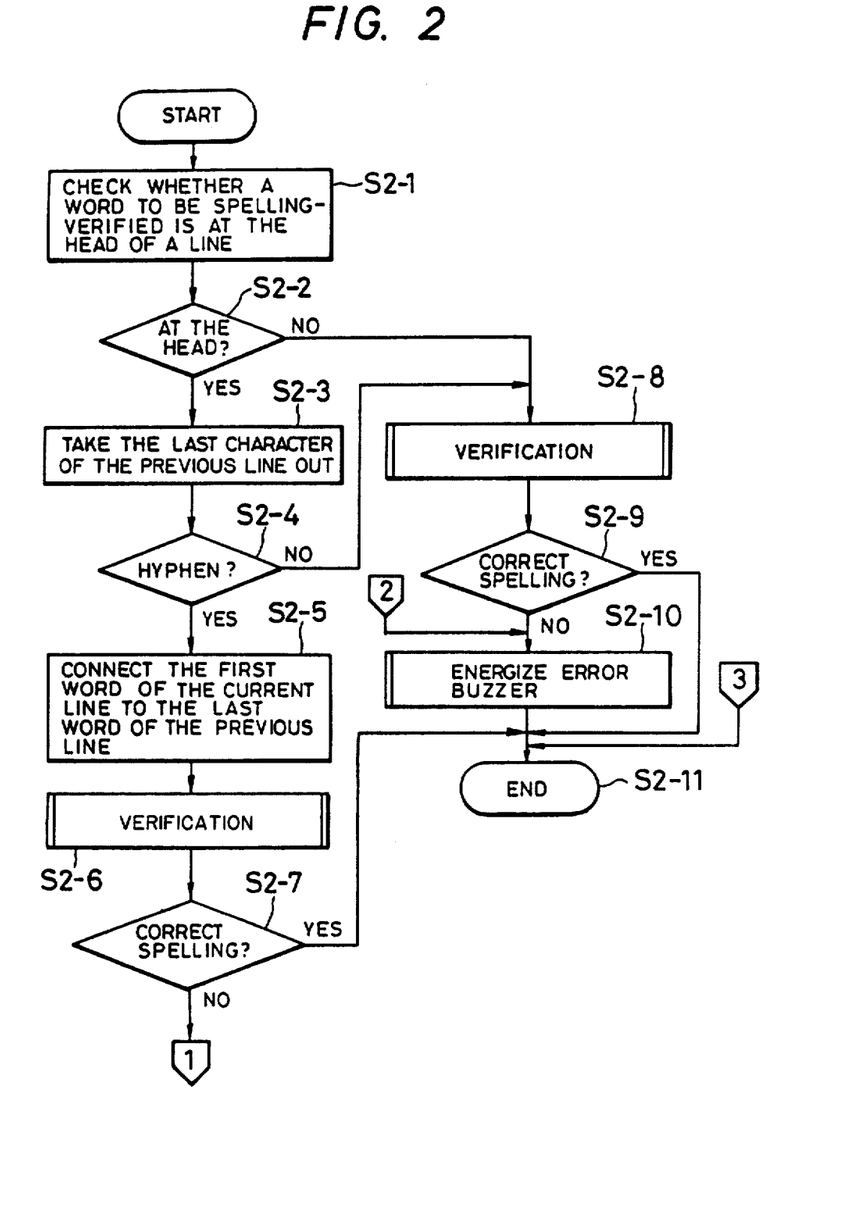
FIGS. 2 and 3 are flowcharts for explaining an algorithm to verify the spelling according to the invention.
Figure 3:
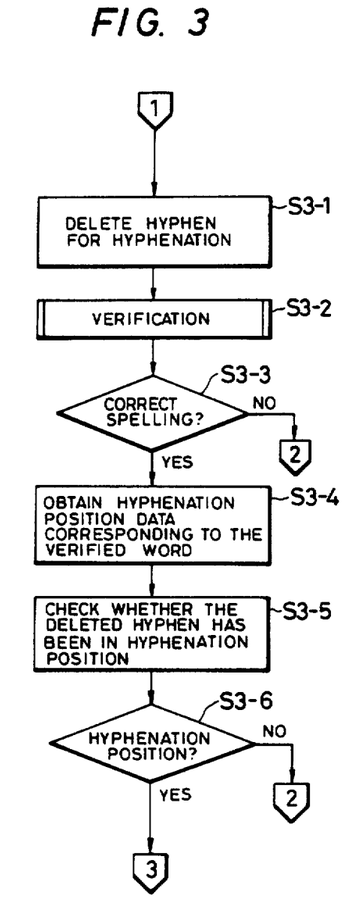
Figure 4:
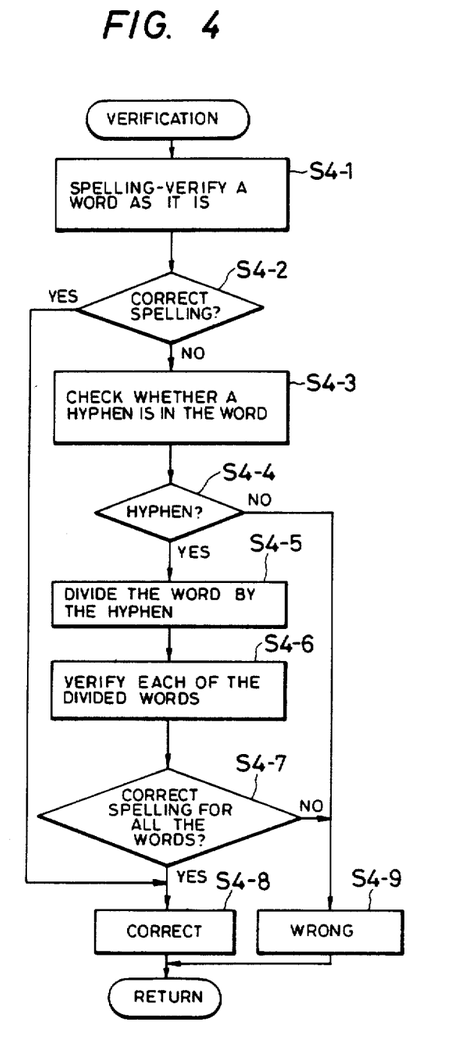
FIG. 4 is a flowchart for explaining an algorithm for the subroutine of "verification"

The spelling verification process will now be described in detail hereinbelow with reference to flowcharts of FIGS. 2 to 4. The control programs which are executed in accordance with the flowcharts shown in FIGS. 2 to 4, which will be explained hereinafter, are stored in a program area PA in the ROM 6 in FIG. 1. The operations according to the flowcharts in FIGS. 2 and 3 are executed by the MPU 5. The operations based on the flowchart shown in FIG. 4 are performed by the spelling verifier 8. In this case, a word whose spelling is verified is loaded into a work area WA in the MPU 5 and is modified as will be explained hereinafter or is subjected to other word processes. The word having the correct spelling or the word having the correct hyphen inserting positions which is read out from the basic dictionary 9 is loaded into a reference word area SW in the MPU 5. The content of the work area WA is compared with the content of the reference word area SW.

FIGS. 2 to 4 are flowcharts for explaining an algorithm of the spelling verification according to the invention.

First, in step 2-1 in FIG. 2, a check is made to see if a word to be spelling-verified exists at the head of a line or not. If NO, step S2-8 follows and the sub-routine of "verification" shown in FIG. 4 will be executed. If YES, steps S2-3 and S2-4 follow and a check is made to see if the last character data of the previous line is a hyphen or not. If NO, hyphenation is not performed; therefore, ordinary spelling verification in step S2-8 is executed. Namely, the word is compared with the correct word stored in the basic dictionary 9. If the last character data is hyphen, the word at the head of the line is nothing but a part of the word divided by the hyphenation process and is not the word to be spelling-verified. Therefore, in step S2-4, the last word at the previous line which was divided by the hyphenation is combined with the first word at the current line to thereby form one word of a complete form. Then, this single complete word is spelling-verified in step S2-6. A check is then made in step S2-7 to see if the spelling of the word is correct or not. If it is incorrect, there is a possibility that the word has been determined to be incorrect because a hyphen was inserted by the hyphenation process. Therefore, in step S3-1 in FIG. 3, the hyphen for the hyphenation is deleted. In step S3-2, spelling verification is again performed. In step S3-3, a check is made to see if the spelling of the word is correct or not. If YES, step S3-4 follows and the hyphenation position data stored in the basic dictionary 9 in correspondence to the spelling-verified word is taken out from this dictionary. This position data is compared in step S3-5. In step S3-6, a check is made to see if the position at which the hyphen was inserted is the correct hyphenation inserting position or not. If it is wrong, step S2-10 in FIG. 2 follows and an error buzzer is energized.

A control procedure for verification in steps S2-8, S2-6, and S3-2 will now be explained with reference to the flowchart of FIG. 4. First, in step S4-1, the spelling of a word is verified as it is. In step S4-2, a check is made to see if the spelling of the word is correct or not. In this case, when a hyphen exists in the word, it is decided to be the wrong word. If spelling is incorrect, steps S4-3 and S4-4 follow and a check is made to see if a hyphen exists in the word or not. If YES, the word is divided into a plurality of words by the hyphen in step S4-5. In step S4-6, the spelling of each word is verified. If it is determined in step S4-7 that all of the spellings of the verified words are correct, the spelling of the word is determined to be correct in step S4-8 and MPU 5 is informed of this fact. If no hyphen was found in step S4-4 or if at least one word having the wrong spelling was found in step S4-7, the spelling of the word is determined to be wrong and MPU 5 is informed of this fact.

The foregoing algorithm will be explained using a practical example.

Figure 5:
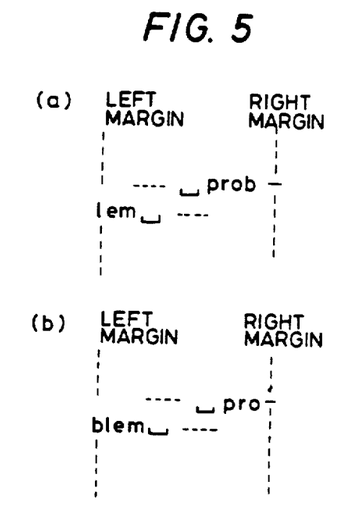
FIGS. 5(a) and 5(b) are diagrams showing the positions in a sentence of a word "problem"

FIG. 5(a) is a diagram showing a state in which the word "problem" was divided by the hyphenation and printed in two lines.

In step S2-1 in FIG. 2, "lem" is printed at the head of a line. Therefore, the processing routine advances from step S2-2 to step S2-3 and the last character "-" of the previous line is taken out. In this case, since the last character is a hyphen, the last word of the previous line is combined with the first word in the current line to thereby form "prob-lem" in step S2-5 and its spelling is verified in step S2-6. Then, the processing routine advances to step S4-1 in FIG. 4 and the spelling of the word "prob-lem" is verified as it is. In this case, since the spelling is wrong, a check is made in step S4-3 to see if a hyphen exists in the word or not. In this case, since the hyphen exists in the word, the spelling of each of the words "prob" and "lem" is verified in steps S4-4 and S4-5. However, since they are incorrect (in the case of a word "mother-in-law", the spellings of "mother", "in", and "law" are respectively correct), the processing routine advances from step S4-7 to step S4-9. Then, the processing routine advances from step S2-7 in FIG. 2 to step S3-1 in FIG. 3 and the hyphen for hyphenation is deleted to thereby form "problem". The spelling of the word "problem" is again verified in step S4-1 in FIG. 4. In this case, since the spelling is correct, the processing routine advances from step S3-3 to step S3-4 in FIG. 3 and "prob.lem" is read out of the basic dictionary 9 as the hyphenation position data of "problem". In step S3-5, a check is made to see if the deleted hyphen has been in the correct hyphenation position or not by comparing the data. In this case, since the answer is YES, the spelling verification is finished in step S2-11 in FIG. 2.

FIG. 5(b) shows the case where a word "problem" was erroneously hyphened. In this case as well, similarly to the foregoing example, "prob.lem" is compared with "prob-lem" in steps S3-4 and S3-5 in FIG. 3. Since the hyphenation position is incorrect as the result of the comparison, the processing routine advances from step S3-6 to step S2-10 in FIG. 2 and an error buzzer is energized, thereby informing the operator of the fact that the position of the hyphen is wrong.

Figure 6:
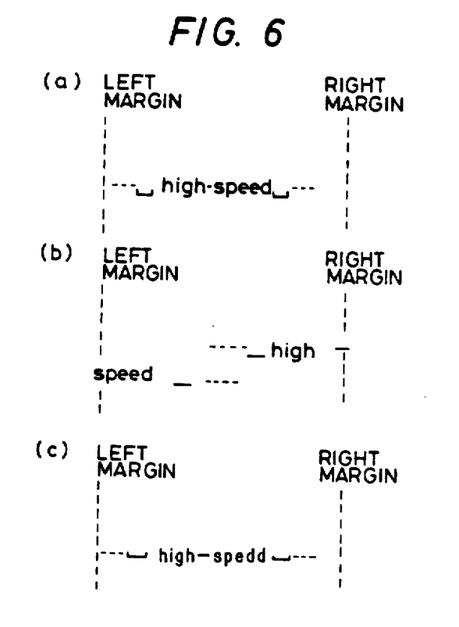
FIGS. 6(a), 6(b) and 6(c) are diagrams showing the positions widths of sentences of words "high-speed" and "high-spedd"

The verification of the spelling of the next synthesized word "high-speed" will now be explained. FIG. 6(a) shows the case where "high-speed" is not at the head of a line. This word is decided to have the correct spelling by executing the processes in steps S2-1, S2-2, S2-8, S4-1, S4-2, S4-3, S4-4, S4-5, S4-6, S4-7, S4-8, S2-9, and S2-11.

Further, as shown in FIG. 6(b), when this word was hyphened, the word is determined to have the correct spelling by executing the processes in steps S2-1, S2-2, S2-3, S2-4, S2-5, S2-6, S4-1, S4-2, S4-3, S4-4, S4-5, S4-6, S4-7, S4-8, S2-7, and S2-11.

FIG. 6(c) shows the state of a synthesized word "high-spedd" containing the wrong spelling. This word is decided to have a wrong spelling by executing the processes in steps S2-1, S2-2, S2-7, S4-1, S4-2, S4-3, S4-4, S4-5, S4-6, S4-7, S4-9, S2-9, S2-10, and S2-11. Thus, the error buzzer indicating that the spelling is wrong is energized.

As shown in the foregoing examples, by use of the algorithm of the invention, the spelling of each of the following words can be accurately verified.

Figure 7:
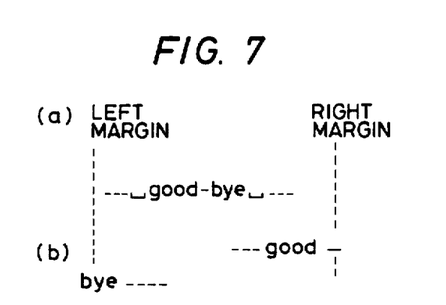
FIG. 7(a) and 7(b) are diagrams showing the positions in a sentence of a word "good-bye"

(1) The word which was subjected to the hyphenation;
(2) The word synthesized by a hyphen;
(3) The word obtained by performing the hyphenation of the word synthesized by a hyphen;

In the foregoing embodiment, the word "high-speed" newly synthesized by a hyphen has been described. However, there are many words which initially include a hyphen. For example, there is a word "good-bye" as shown in FIG. 7. The spellings of those words, however, can be also verified by the foregoing algorithm.

As a next example of application of the invention, a consideration will be made with respect to the process of a hyphen in the case of printing a sentence registered in an RAM of an electronic typewriter. When a registered sentence is printed, there is a case where the sentence is printed at a print width different from that upon registration. Therefore, there is a possibility such that the word subjected to the hyphenation at the time of the registration is not subjected to the hyphenation when it is printed. In this case, it is inconvenient if the hyphen for hyphenation which was inserted upon registration is printed. To prevent this inconvenience, in the actual electronic typewriter, such a hyphen is deleted and thereafter, the registered sentence is printed. On the other hand, in the case of a word such as "good-bye" which initially contains a hyphen, it is improper to delete the hyphen. Therefore, in this case, a special hyphen which is not deleted even when a registered sentence is printed is used. This special hyphen is hereinafter called a permanent hyphen and is expressed by "⟵⟶". In comparison with the permanent hyphen, the foregoing ordinary hyphen is called a non-permanent hyphen and is expressed by "-". Those hyphens are input by different codes so that they can be distinguished when they are input from the keyboard 1. A method of verifying the spellings of words including those hyphens will now be explained hereinbelow.

First, since a non-permanent hyphen is not printed, if a non-permanent hyphen is included in a word, it is deleted.

On the other hand, since a permanent hyphen is used for a synthesized word, it is used as a delimiter to divide the synthesized word into a plurality of words.

Figure 8:
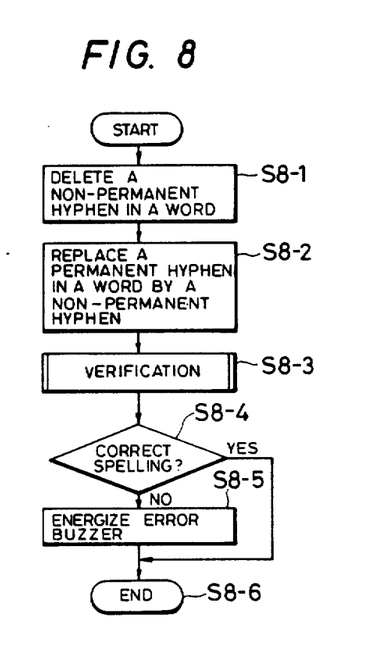
FIG. 8 is a flowchart for explaining an algorithm to verify the spelling according to the application of the invention.

FIG. 8 shows an algorithm for the spelling verification of a registered sentence including a non-permanent hyphen and a permanent hyphen on the basis of the foregoing rule.

In step S8-1, a non-permanent hyphen in a word is deleted. In step S8-2, a permanent hyphen in the word is replaced by the data indicative of a non-permanent hyphen. In step S8-3, the spelling verification is performed. This procedure is the same as the foregoing control procedure according to the flowchart of FIG. 4.

In step S8-4, a check is made to see if the spelling is correct or not. If NO, an error buzzer is energized in step S8-5. If YES, the spelling verification is finished.

For example, the word "prob-lem" including a non-permanent hyphen is changed to "problem" in step S8-1. Thereafter, it is subjected to the processes in steps S8-2, S8-3, S4-1, S4-2, S4-8, S4-4, and S8-6, so that the spelling of the word is determined to be correct.

A synthesized word "high ⟵⟶ speed" including a permanent hyphen is changed to "high-speed" by steps S8-1 and S8-2. The spelling verification is performed in step S8-3. Since the spelling is decided to be correct in step S8-4, the processing routine advances to step S8-6 and is finished.

Lastly, the word "good ⟵⟶ bye" which initially includes a hyphen is subjected to the processes in steps S8-1 and S8-2 and is changed to "good-bye". The spelling verification is performed in step S8-3. Since the spelling is determined to be correct in step S8-4, the processing routine advances to step S8-6 and is finished.

As described above, by applying the algorithm of the invention to the spelling verification of a word including a hyphen, there is an effect such that the spelling verification of words in a registered sentence can be accurately performed with respect to a word which was subjected to the hyphenation, a word synthesized by a hyphen, a word which initially includes a hyphen, and the words obtained by performing the hyphenation on these words.

On the basis of the spelling verification of a word including a hyphen described above, the operator may also be informed of a possible word having the correct spelling. It is also possible to distinguish and inform an operator of an error in the spelling and an error in the inserting position of a hyphen.

Figure 11:
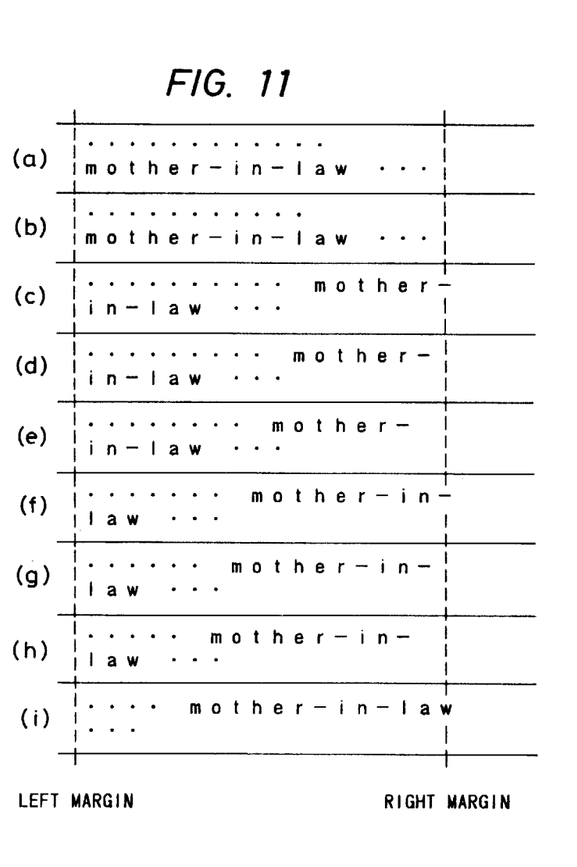
Figure 12:
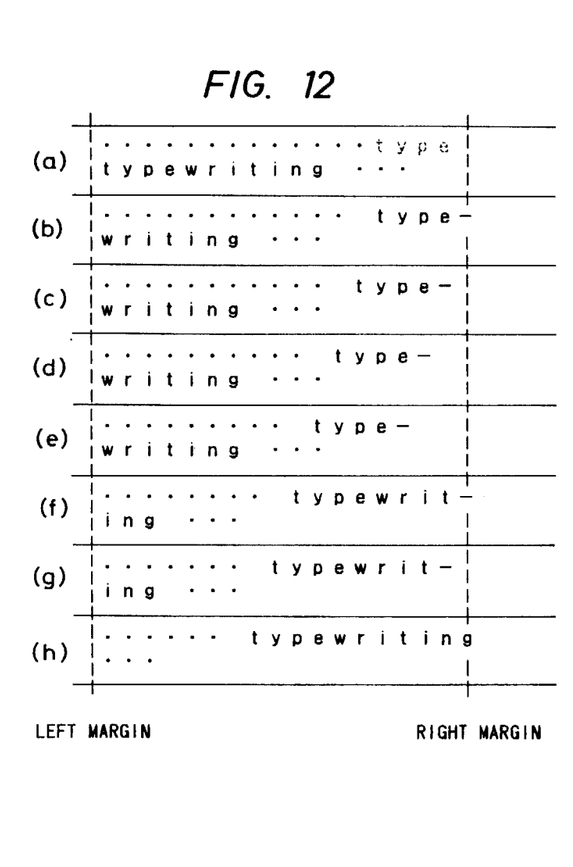

FIG. 10 is a flowchart for an automatic hyphenation process. FIGS. 11 and 12 are diagrams showing examples of the print states after the automatic hyphenation process was performed.

An explanation will be made with respect to the case where in an electronic typewriter of the constitution shown in FIG. 1, an English document stored in the document storage area TXT in the RAM 7 is printed due to the automatic hyphenation. Character data is input from the keyboard 1 and is stored in the document storage area TXT.

Prior to printing, the operator preliminarily determines the processing mode of the hyphenation by operating the key on the keyboard 1. There are two kinds of manual and automatic modes. When the manual mode is selected, the operator must designate the hyphenation position at any time as in the conventional apparatus; therefore, its description is omitted. The automatic mode is set in order to perform the automatic hyphenation. This mode is stored in a mode storage area MD in the RAM 4.

After the processing mode was set, the user starts printing the stored document. A print command is sent as a signal to the control unit MPU 5 through the keyboard 1. In response to the print command signal, the MPU 5 decodes it and loads a control command corresponding to the result of the decoding from the ROM 6 of the memory device. A method of processing and printing the stored document is as follows.

An area from a character to be printed next to characters to be printed in one line is designated in the document stored in the document storage area TXT in the RAM 7. The number of characters to be printed in one line is specified by the right margin stored in the right margin storage area RM and the left margin stored in the left margin storage area LM. This number is equal to the number of characters between the left and right margins of the format set for the document. For example, when the number of characters between the left and right margins of a document starting from a sentence of This␣is␣an␣electronic␣typewriter.

is 22, in the case of printing this document, an area of the first twenty-two characters is designated and the printing operation is performed.

Namely, a character string of

This␣is␣an␣electronic␣ are printed and thereafter, the line is fed to a new line. In this manner, the document subsequent to "typewriter." is also cut every twenty-two characters and the printing operation and line feed operation are repeated.

However, if the number of characters between the left and right margins is set to 30 in the foregoing example, an area which is first designated is This ␣is␣an␣electronic␣typewrit Thus, a word "typewriter" cannot be included in one line. In such a case, the word "typewriter" is not simply divided nor printed in two lines but "typewrit" and "er" are regarded as two words on the basis of the rule of orthography. According to this rule, the spelling of a word across two lines must be combined by a hyphen. Namely, This␣is␣an␣electronic␣typewriter. . . .

must be printed. This process is what is called a hyphenation. On the other hand, in the case of a short word such as "vse" or the like, if it is divided by a hyphen, it is difficult to understand the word. In such a case, the process of what is called a word wrap to feed the line to a new line at the last blank in the line is executed. In the foregoing example, This␣is␣an␣electronic typewriter. . . .

is printed. A sentence is printed one line by one by executing a combination of those hyphenation and word wrap processes.

To automatically perform those processes, the following three kinds of processes are necessary. Either one of the three processes is selected in dependence on the state of the former half portion of a word divided into two parts.

Process 1:

When the character of a hyphen is included in the former half portion, the line is fed to a new line at this hyphen. For example, when a word "All-American" is divided into two parts "All-Ame/rican", a hyphen is included in the former half portion. Therefore, this word is again divided into "All-/American" and printed.

Process 2:

When the character of a hyphen is not included in the former half portion but a position at which the hyphenation can be performed exists, the hyphenation is performed at the rightmost position. In the hyphenation, the position at which the hyphenation can be performed is predetermined every word. This position is searched using the basic dictionary 9. For example, in the case of a word "typewriter", the hyphenation must not be performed at positions other than the following two points indicated by ".".

type.writ.er This is the rule of orthography. Therefore, when the word "typewriter" was divided into "typewr/iter", it is redivided at the position in the former half portion at which the hyphenation can be performed. In this example, it is divided into "type/writer". However, if it was divided into "typewrite/r", this word is divided at the rightmost position at which the hyphenation can be performed, so that the word is divided into "typewrit/er".

Process 3:

When the character of a hyphen is not included in the former half portion and the position at which the hyphenation can be performed does not exist, the word wrap process is executed. For example, if the word "typewriter" was divided into "ty/pewriter", since the position at which the hyphenation can be performed does not exist in "ty", the word wrap process is executed. The line is fed at the blank character before the word "typewriter", so that "typewriter" is printed on the next line.

FIG. 10 shows a flowchart to execute the foregoing three kinds of processes. This flowchart all relates to the last character of a line. First, when a word cannot be printed on a line, a check is made in step S1 to see if a character of the hyphen exists in the character string in the former half portion of the word which could not be printed in one line. A check in the process 1 is performed in this manner. In step S2, a check is made to see if the hyphen has been detected or not. If YES, in step S3, the line is fed at the position of the hyphen. If no hyphen is found in step S1, in order to execute process 2 or 3, in step S4, the divided word is sent as a non-divided form to a buffer BVFF for search and is transferred from the MPU 5 to the SV/SC 5. The SV/SC 5 searches the dictionary 9 from the spelling of the word and reads out the hyphenation information of this word. The readout hyphenation information is supplied to a comparison buffer CB in the MPU 5. This information is obtained in step S5. Either the process 2 or the process 3 is selected on the basis of the hyphenation information in step S6. Namely, in step S6, a check is made to see if a hyphen can be inserted before the right margin or not. If YES, the process 2 is executed in step S8. Namely, a hyphen is inserted at a suitable hyphen inserting position and the line is fed. On the contrary, if NO in step S6, the word wrap process of the process is executed in step S7. Namely, the line is fed at the rightmost blank in one line.

As described above, either one of the three processes is executed and a print range is designated. Thereafter, the print routine in step S9 follows. After completion of the printing, the processes of the next and subsequent lines are continued. As described above, when a word is printed across two lines, by executing either one of the three processes, the hyphenation can be also automatically performed at the more ideal position which is correct from the viewpoint of calligraphy.

FIG. 11 shows a practical example. FIG. 11(a) shows an example of the printing in the case where word "mother-in-law" was divided into "mothe/r-in-law". Since a hyphen and the position at which the hyphenation can be performed do not exist in the former half portion, the process 3 is executed. FIG. 11(b) shows an example of the printing in the case where the word "mother-in-law" was divided into "mother/-in-law". It is strange that a hyphen is printed at the head of a line. A hyphen and the position at which the hyphenation can be performed do not exist in the former half portion. Therefore, the process 3 is executed. FIGS. 11(c), 11(d), and 11(e) show the cases where the word "mother-in-law" was divided into "mother-/in-law", "mother-i/n-law", and "mother-in/ -law". Since a hyphen exists in the former half portion in each of those cases, process 3 is performed. FIGS. 11(f), 11(g), and 11(h) show the cases where a word "mother-in-law" was divided into "mother-in-/law", "mother-in-1/aw", and "mother-in-la/w". Since a hyphen exists in the former half portion in each of these cases, the process 3 is executed. In this case, although two hyphens exist in the former half portion, similar to the case of the position at which the hyphenation can be performed, when a plurality of hyphens exist, the line is fed at the rightmost hyphen. In FIG. 11(i), the word "mother-in-law" is not divided. Therefore, no special process is executed.

FIG. 12 shows an example in which no hyphen exists in a word. A word "typewriting" can be subjected to the hyphenation at two points "." shown by "type.writ. ing". FIG. 12(a) shows an example of the printing in the case where a word "typewriting" was divided into "type/writing". However, if the hyphen for the hyphenation is printed, it exceeds the right margin and does not conform with the format. Therefore, the process 2 cannot be performed. The process 3 for the word wrap process is executed.

FIGS. 12(b), 12(c), and 12(d) show examples of the printing in the cases where the word "typewriting" was divided into "typew/riting", "typewr/iting", and "typewri/ting". Since these cases satisfy the condition in step S6, the process 2 is executed. FIG. 12(e) shows an example of the printing in the case where the word "typewriting" was divided into "typewrit/ing". In this case, there are two positions at which the hyphenation can be performed. However, this word can be divided into "type/writing" because of the reason similar to the case of FIG. 12(a). FIGS. 12(f) and 12(g) show examples of the printing in the cases where a word "typewriting" was divided into "typewriti/ng" and "typewritin/g". There are two positions at which the hyphenation can be performed and the word is divided at the position on the right side. FIG. 12(h) shows the case where the word "typewriting" is not divided. Therefore, a special process is not executed in this case.

In this embodiment, the hyphenation when printing all together has been automated by use of the data base having the hyphenation information. However, when the sequential printing operation is performed or when the hyphenation is performed in the manual mode, it is possible to discriminate whether or not the hyphenation position designated by the user is correct by comparing this position with the hyphenation information in the data base.

By automatically executing the hyphenation using a storage device having the hyphenation information as described above, the operating efficiency of the user when a document is printed is remarkably improved. Also errors in calligraphy are also eliminated. Even the user having little knowledge of calligraphy can easily correctly the form a document.

According to the invention, the text information before it is output and the text information after it was output are the same. The hyphenation can be automatically executed in accordance with the output format.

We claim:
1. A document processing apparatus comprising:
   memory means for storing data to be used to verify both a spelling of a word including a syllable hyphen and a spelling of a word including no syllable hyphen;
   means for reading out a word across two lines in a document processing format;

verifying means for accessing said memory means and verifying the spelling of a word; and control means for allowing said verifying means to execute the verifying operation one or more times for the word read out by said readout means, for discriminating whether a hyphen in said word across two lines is a hyphen to form a synthesized word or a syllable hyphen, and for controlling said verifying means so as to perform the spelling verification.

2. An apparatus according to claim 1, wherein said memory means is a dictionary memory having the correct spelling and correct syllable hyphen position of each word.

3. An apparatus according to claim 1, wherein the hyphen to form a synthesized word is a permanent hyphen.

4. An apparatus according to claim 3, wherein the permanent hyphen divides the synthesized word at the end of a line.

5. An apparatus according to claim 1, wherein said control means discriminates whether or not a hyphen is included in the word across two lines which was read out by said readout means, and when said hyphen is included, said control means controls said verifying means so as to verify each of the words to be divided by said hyphen.

6. An apparatus according to claim 1, wherein said control means discriminates whether or not a hyphen is included in the word across two lines which was read out by said reading means, and when said hyphen is included, said control means deletes this hyphen and controls said verifying means so as to verify the spelling of said word.

7. An apparatus according to claim 1, wherein said verifying means verifies the spelling of the word and also verifies whether or not a hyphen has been inserted to the correct hyphen position.

8. An apparatus according to claim 1, wherein said verifying means produces a verification result, wherein said apparatus further comprises informing means for informing an operator of the verification result of said verifying means.

9. An apparatus according to claim 1, further comprising control means for controlling said verifying means for replacing the hyphen to form a synthesized word by said syllable hyphen and thereby performing the verifying process.

10. A method of verifying a spelling, comprising:

a first step of verifying a spelling of each of word portions connected by a hyphen for a word which includes the hyphen at the last position of a line, wherein the word extends to the next line in accordance with a document editing format;

11. A method according to claim 10, wherein when it is determined in said first step that the spelling of each word is correct, or when it is determined in said third step that the spelling of each word and the inserting position of the hyphen are correct, said verifying process is finished.

12. A method according to claim 10, wherein when it is determined in said first step that the spelling of any one of the words is wrong, or when it is determined in said second step that the spelling of said one word is wrong, or when it is determined in said third step that the inserting position of the hyphen is wrong, this fact is informed to the operator.

13. A method according to claim 10, wherein said first, second and third steps perform verifying and/or checking using a dictionary.

14. A document processing apparatus comprising:

input means for inputting character data including a syllable hyphen or a hyphen to form a synthesized word;

memory means for storing some character data input from said input means;

basic dictionary means in which correct hyphen inserting positions of a plurality of words are stored;

comparing means for comparing said some character data stored in said memory means as one word with the content of said basic dictionary means; and informing means for informing an operator that a hyphen is not inserted in the correct hyphen inserting position in response to a comparison performed by said comparing means.

15. An apparatus according to claim 14, wherein the words extending across two lines and including a hyphen in the character data stored in said memory means are regarded as one word and this one word is compared by said comparing means.

16. An apparatus according to claim 14, wherein said comparing means verifies both of the correct spelling and the correct inserting position of the hyphen.

* * * * *

UNITED STATES PATENT AND TRADEMARK OFFICE
CERTIFICATE OF CORRECTION

PATENT NO. : 4,974,195

DATED : November 27, 1990

INVENTOR(S) : Takashi Amari et al.

Page 1 of 2

It is certified that error appears in the above-identified patent and that said Letters Patent is hereby corrected as shown below:

COLUMN 1:

Line 4, "continuation-in-part" should read --continuation--

COLUMN 8:

Line 24, "|__| typewriter ...." should read -- |__| typewrit- ¶ er. .....--.

Line 32, " |__| electronic typewriter ...." should read -- |__| electronic ¶ typewriter. .....--

Line 63, "type.writ.er This" should read --type.writ.er ¶ This--.

UNITED STATES PATENT AND TRADEMARK OFFICE
CERTIFICATE OF CORRECTION

PATENT NO. : 4,974,195
DATED : November 27, 1990
INVENTOR(S) : Takashi Amari et al.

It is certified that error appears in the above-identified patent and that said Letters Patent is hereby corrected as shown below:

COLUMN 10:

LIne 3, "mother-in-l/aw"," should read --"mother-in-l/aw",--.

Line 54, "Also" should read --Also,-- and "also" (second occurrence) should be deleted.

Line 56, "the" should be deleted.

Signed and Sealed this

Third Day of November, 1992

Attest:

DOUGLAS B. COMER

Attesting Officer

Acting Commissioner of Patents and Trademarks